(12) United States Patent
Hu

(10) Patent No.: US 6,797,114 B2
(45) Date of Patent: Sep. 28, 2004

(54) TISSUE PRODUCTS

(75) Inventor: Sheng-hsin Hu, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/154,490

(22) Filed: May 23, 2002

(65) Prior Publication Data
US 2003/0111198 A1 Jun. 19, 2003

Related U.S. Application Data

(63) Continuation-in-part of application No. 10/025,192, filed on Dec. 19, 2001, now abandoned.

(51) Int. Cl.[7] ................................................ D21H 11/00
(52) U.S. Cl. .................... 162/109; 162/111; 162/113; 162/130; 162/129; 162/127; 162/123; 162/125; 162/117
(58) Field of Search .................... 162/109, 111, 162/113, 130, 129, 127, 123, 125, 117

(56) References Cited

U.S. PATENT DOCUMENTS

| | | |
|---|---|---|
| 3,085,927 A | 4/1963 | Pesch |
| 3,598,696 A | 8/1971 | Beck |
| 3,695,985 A | 10/1972 | Brock et al. |
| 3,791,917 A | 2/1974 | Bolton, III |
| 3,903,342 A | 9/1975 | Roberts, Jr. |
| 3,953,638 A | 4/1976 | Kemp |
| 3,997,647 A | 12/1976 | Lassen |
| 4,075,382 A | 2/1978 | Chapman et al. |
| 4,100,017 A | 7/1978 | Flautt, Jr. |
| 4,113,911 A | 9/1978 | LaFitte et al. |
| 4,145,464 A | 3/1979 | McConnell et al. |
| 4,166,001 A | 8/1979 | Dunning et al. |
| 4,196,245 A | 4/1980 | Kitson et al. |
| 4,207,367 A | 6/1980 | Baker, Jr. |
| 4,225,382 A | 9/1980 | Kearney et al. |
| 4,239,792 A | 12/1980 | Ludwa |
| 4,256,111 A | 3/1981 | Lassen |
| 4,287,251 A | 9/1981 | King et al. |
| 4,298,649 A | 11/1981 | Meitner |
| 4,300,981 A | 11/1981 | Carstens |
| 4,326,000 A | 4/1982 | Roberts, Jr. |
| 4,377,615 A | 3/1983 | Suzuki et al. |
| 4,436,780 A | 3/1984 | Hotchkiss et al. |
| 4,445,974 A | 5/1984 | Stenberg |
| 4,469,735 A | 9/1984 | Trokhan |
| 4,517,054 A | 5/1985 | Hujala et al. |
| 4,537,822 A | 8/1985 | Nanri et al. |

(List continued on next page.)

FOREIGN PATENT DOCUMENTS

| | | |
|---|---|---|
| EP | 0568404 A1 | 11/1993 |
| EP | 0631014 A1 | 12/1994 |
| EP | 0824157 | 2/1998 |
| WO | WO 9600811 | 1/1996 |
| WO | WO 9715711 | 5/1997 |
| WO | WO 9823813 | 6/1998 |
| WO | WO 9823814 | 6/1998 |

OTHER PUBLICATIONS

Jorma Lumiainen, "Refining of chemical pulp", 9 pages.
PCT Search Report, Jan. 24, 2003.

Primary Examiner—Peter Chin
Assistant Examiner—Mark Halpern
(74) Attorney, Agent, or Firm—Dority & Manning, P.A.

(57) ABSTRACT

In the practice of the invention, a multi-ply paper product or tissue having hardwood layers on the outside and on the inside provides reduced amounts of undesirable sloughing. The multi-ply product includes at least two plies, with three layers in each ply. Hardwood layers, such as for example eucalyptus-containing fiber layers, are provided on the outside surfaces of each ply and also on the interface of one or more plies. The resulting paper product may exhibit reduced sloughing, with little or no sacrifice in softness. A product having two, three, four, or more plies is shown.

23 Claims, 7 Drawing Sheets

U.S. PATENT DOCUMENTS

| | | | |
|---|---|---|---|
| 4,548,856 A | 10/1985 | Khan et al. |
| 4,610,915 A | 9/1986 | Crehshaw et al. |
| 4,614,566 A | 9/1986 | Koponen et al. |
| 4,618,524 A | 10/1986 | Groitzsch et al. |
| 4,744,866 A | 5/1988 | Koponen et al. |
| 4,781,793 A | 11/1988 | Halme |
| 4,816,320 A | 3/1989 | Cyr |
| 4,853,086 A | 8/1989 | Graef |
| 4,885,202 A | 12/1989 | Lloyd et al. |
| 4,888,092 A | 12/1989 | Prusas et al. |
| 4,897,155 A | 1/1990 | Koteles |
| 4,946,557 A | 8/1990 | Svending |
| 4,964,954 A | 10/1990 | Johansson |
| 4,964,955 A | 10/1990 | Lamar et al. |
| 4,983,258 A | 1/1991 | Maxham |
| 5,002,633 A | 3/1991 | Maxham |
| 5,011,741 A | 4/1991 | Hoffman |
| 5,048,589 A | 9/1991 | Cook et al. |
| 5,087,324 A | 2/1992 | Awofeso et al. |
| 5,127,994 A | 7/1992 | Johansson |
| 5,129,988 A | 7/1992 | Farrington, Jr. |
| 5,133,832 A | 7/1992 | Gilkey |
| 5,137,599 A | 8/1992 | Maxham |
| 5,192,388 A | 3/1993 | Schöllkopf et al. |
| 5,228,954 A | 7/1993 | Vinson et al. |
| 5,336,373 A | 8/1994 | Scattolino et al. |
| 5,397,435 A | 3/1995 | Ostendorf et al. |
| 5,399,412 A | 3/1995 | Sudall et al. |
| 5,409,572 A | 4/1995 | Kershaw et al. |
| 5,468,348 A | 11/1995 | Blackledge et al. |
| 5,468,396 A | 11/1995 | Allen et al. |
| 5,494,554 A | 2/1996 | Edwards et al. |
| 5,501,768 A | 3/1996 | Hermans et al. |
| 5,510,001 A | 4/1996 | Hermans et al. |
| 5,527,432 A | 6/1996 | Leuthold et al. |
| 5,529,665 A | 6/1996 | Kaun |
| 5,543,202 A | 8/1996 | Clark et al. |
| 5,582,681 A | 12/1996 | Back et al. |
| 5,591,309 A | 1/1997 | Rugowski et al. |
| 5,607,551 A * | 3/1997 | Farrington et al. ......... 162/109 |
| 5,616,207 A | 4/1997 | Sudall et al. |
| 5,620,565 A | 4/1997 | Lazorisak et al. |
| 5,667,636 A | 9/1997 | Engel et al. |
| 5,730,839 A | 3/1998 | Wendt et al. |
| 5,785,813 A | 7/1998 | Smith et al. |
| 5,830,317 A | 11/1998 | Vinson et al. |
| 5,830,320 A | 11/1998 | Park et al. |
| 5,834,095 A | 11/1998 | Dutkiewicz et al. |
| 5,853,539 A | 12/1998 | Smith et al. |
| 5,858,021 A | 1/1999 | Sun et al. |
| 5,993,602 A | 11/1999 | Smith et al. |
| 6,001,218 A | 12/1999 | Hsu et al. |
| 6,017,417 A | 1/2000 | Wendt et al. |
| 6,024,834 A | 2/2000 | Horton, Jr. et al. |
| 6,027,610 A | 2/2000 | Back et al. |
| 6,039,839 A | 3/2000 | Trokhan et al. |
| 6,074,527 A | 6/2000 | Hsu et al. |
| 6,080,266 A | 6/2000 | Horton, Jr. et al. |
| 6,156,157 A | 12/2000 | Schroeder et al. |
| 6,207,012 B1 | 3/2001 | Oriaran et al. |
| 6,248,210 B1 | 6/2001 | Edwards et al. |
| 6,296,736 B1 | 10/2001 | Hsu et al. |
| 6,372,085 B1 | 4/2002 | Hsu et al. |
| 6,387,210 B1 | 5/2002 | Hsu et al. |
| 6,391,154 B1 | 5/2002 | Nygard et al. |
| 6,413,363 B1 | 7/2002 | Hsu et al. |
| 162,635 A1 | 11/2002 | Hsu |
| 6,511,579 B1 | 1/2003 | Edwards et al. |

\* cited by examiner

TISSUE PRODUCTS

RELATED APPLICATIONS

This application is a continuation-in-part of U.S. application Ser. No. 10/025,192, which was filed on Dec. 19, 2001 now abandoned.

BACKGROUND OF THE INVENTION

Strength and softness are important attributes in consumer tissue products such as facial tissue, bathroom tissue, towels, and napkins. Strength and softness are strongly influenced by the sheet structure of a tissue product. Mechanical treatment of fibers and fiber slurries in the manufacture of tissue products is an important factor in determining the strength and softness of products that are produced thereby.

Strength and softness usually are inversely related. That is, the stronger a given sheet, the less softness that sheet is likely to provide. Likewise, a softer sheet is usually not as strong. Thus, an inverse relationship that exists between the properties of strength and softness results in consistent efforts in the industry to produce sheets or webs having strength levels which are at least as great as conventional sheets, but with improved softness. Also, a sheet or web that is at least as soft as previously known sheets, but with improved strength, also is desirable.

As a general rule, fibers having superior softness are provided in outer layers of tissue products—i.e., those layers that routinely contact the skin of consumers. This is true for bath tissue, for example. The inner layers of such products often comprise softwood fibers that provide strength. Further, debonding agents have also traditionally be utilized to further soften the tissue product.

Unfortunately, however, sloughing sometimes is increased by the use of debonding agents. Sloughing may be described generally as the loss of paper particles from the surface of the paper due to surface abrasion. Many consumers react negatively to paper that exhibits a high degree of sloughing. Therefore, efforts are commonly made to provide a tissue product that exhibits a minimal amount of sloughing. Many changes that are made to paper manufacture to decrease sloughing have the undesirable side effect of stiffening the tissue (i.e., reducing softness). Thus, in the manufacture of tissue products it is a constant struggle to reduce sloughing of such products without adverse effects upon softness levels.

One conventional tissue product is a two-ply product in which each ply has two layers. In particular, each ply usually contains a hardwood layer that faces the consumer and a softwood layer that faces the softwood layer of the other ply. Thus, the inner softwood layers of each ply are in contact with each other. Another conventional tissue product is a single ply product having three layers. The outer layers usually contain hardwood fibers, while the inner layer contains softwood fibers. Although these products may be soft due to the presence of hardwood fibers, they also tend to generate a significant level of slough.

Thus, it would be desirable to provide a process, system and product that is capable of providing a high degree of softness and strength, with reduced amounts of sloughing. Furthermore, a layered tissue product that reveals reduced sloughing with a minimal or negligible effect upon softness levels would be desirable.

SUMMARY OF THE INVENTION

In accordance with one embodiment of the present invention, a multi-ply tissue product is disclosed that comprises a first ply and a second ply. The first ply comprises a first hardwood layer, a second hardwood layer, and a softwood layer positioned between the first and second hardwood layers of the first ply. The second ply comprises a first hardwood layer, a second hardwood layer, and a softwood layer positioned between the first and second hardwood layer of the second ply, wherein the second hardwood layer of the first ply is positioned adjacent to the first hardwood layer of the second ply. In one embodiment, for example, a two-ply tissue product can be formed in which the first hardwood layer of the first ply and the second hardwood layer of the second ply define an outer surface of the product. The resulting tissue product may exhibit reduced sloughing, with little or no sacrifice in softness.

In some embodiments, the tissue product further comprises a third ply. The third ply comprises a first hardwood layer, a second hardwood layer, and a softwood layer positioned between the first and second hardwood layers of the third ply, wherein the first hardwood layer of the third ply is positioned adjacent to the second hardwood layer of the second ply. In one embodiment, a three-ply tissue product can be formed in which the first hardwood layer of the first ply and the second hardwood layer of the third ply define outer surfaces of the product.

Further, in some embodiments, the tissue product can further comprise a fourth ply. The fourth ply comprises a first hardwood layer, a second hardwood layer, and a softwood layer positioned between the first and second hardwood layers of the fourth ply, wherein the first hardwood layer of the fourth ply is positioned adjacent to the second hardwood layer of the third ply. In one embodiment, a four-ply tissue product can be formed in which the first hardwood layer of the first ply and the second hardwood layer of the fourth ply define outer surfaces of the product.

Other features and aspects of the present invention are discussed in greater detail below.

BRIEF DESCRIPTION OF THE DRAWINGS

A full and enabling disclosure of this invention, including the best mode shown to one of ordinary skill in the art, is set forth in this specification.

DETAILED DESCRIPTION OF REPRESENTATIVE EMBODIMENTS

Figure 1:
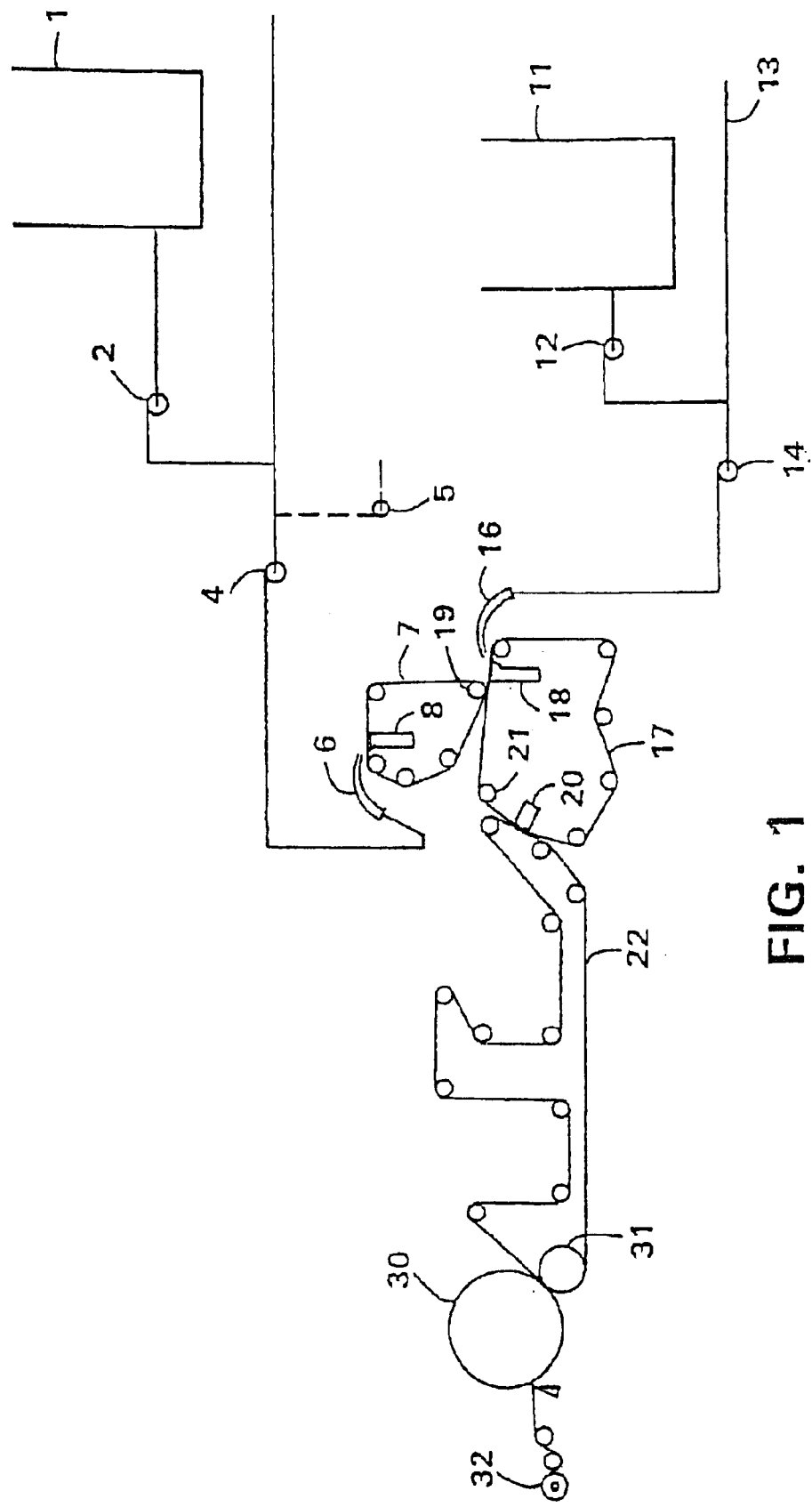
FIG. 1 is a schematic flow diagram of one embodiment of a papermaking process that can be used in the present invention.

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

Surprisingly, in the practice of this invention, it has been discovered that a multi-ply tissue product in which the interface of two or more of the plies constitute hardwood layers can provide superior sloughing and softness characteristics. For example, a multi-ply product that contains at least two plies, with three layers in each ply, and having hardwood layers on both the outside surfaces and at the interfaces (i.e., in the middle) may exhibit reduced sloughing, with little or no sacrifice in softness.

As used herein, the term "layer" generally refers to a single thickness, course, stratum, or fold that may lay on its own, or that may lay over or under another. Further, the term "ply" can refer to a material produced from a headbox having one or more layers and a material produced by pressing together two or more wet webs that are each formed from a headbox having a single layer.

As used herein, a "tissue product" generally refers to various tissue products, such as facial tissue, bath tissue, paper towels, napkins, and the like. Normally, the basis weight of a tissue product of the present invention is less than about 80 grams per square meter (gsm), and in some embodiments less than about 60 gsm, and in other embodiments between about 10 to about 60 gsm. The basis weight for all examples provided below is 30 gsm.

A wide variety of cellulosic fibers may generally be employed in the process of the present invention. Illustrative cellulosic fibers that may be employed in the practice of the invention include, but are not limited to, wood and wood products, such as wood pulp fibers (e.g., softwood or hardwood pulp fibers); non-woody paper-making fibers from cotton, from straws and grasses, such as rice and esparto, from canes and reeds, such as bagasse, from bamboos, form stalks with bast fibers, such as jute, flax, kenaf, cannabis, linen and ramie, and from leaf fibers, such as abaca and sisal. It is also possible to use mixtures of one or more cellulosic fibers. It is generally desired that the cellulosic fibers used herein be wettable. Suitable cellulosic fibers include those that are naturally wettable. However, naturally non-wettable fibers can also be used.

Softwood sources include trees sources, such as pines, spruces, and firs and the like. Hardwood sources, such as oaks, eucalyptuses, poplars, beeches, and aspens, may be used, but this list is by no means exhaustive of all the hardwood sources that may be employed in the practice of the invention. Hardwood fiber sources generally contain fibers of a shorter length than softwood sources. Many times, sloughing occurs when shorter fibers flake or fall from the outer hardwood layers of multi-layered tissues.

Fibers from different sources of wood exhibit different properties. Hardwood fibers, for example, tend to show high degrees of "fuzziness" or softness when placed on the exterior surface of a tissue product, such as a bathroom tissue. In many embodiments of the invention, a first furnish comprising a strength layer is employed. This first furnish may be a softwood, for example. The average fiber length of a softwood fiber typically is about two to four times longer than a hardwood fiber. In the practice of the present invention, it is desired that the cellulosic fibers be used in a form wherein the cellulosic fibers have already been prepared into a pulp. As such, the cellulosic fibers will be presented substantially in the form of individual cellulosic fibers, although such individual cellulosic fibers may be in an aggregate form such as a pulp sheet. This is in contrast with untreated cellulosic forms such as wood chips or the like. Thus, the current process is generally a post-pulping, cellulosic fiber separation process as compared to other processes that may be used for high-yield pulp manufacturing processes.

The preparation of cellulosic fibers from most cellulosic sources results in a heterogeneous mixture of cellulosic fibers. The individual cellulosic fibers in the mixture exhibit a broad spectrum of values for a variety of properties such as length, coarseness, diameter, curl, color, chemical modification, cell wall thickness, fiber flexibility, and hemicellulose and/or lignin content. As such, seemingly similar mixtures of cellulosic fibers prepared from the same cellulosic source may exhibit different mixture properties, such as freeness, water retention, and fines content because of the difference in actual cellulosic fiber make-up of each mixture or slurry.

In general, the cellulosic fibers may be used in the process of the present invention in either a dry or a wet state. However, it may be desirable to prepare an aqueous mixture comprising the cellulosic fibers wherein the aqueous mixture is agitated, stirred, or blended to effectively disperse the cellulosic fibers throughout the water.

The cellulosic fibers are typically mixed with an aqueous solution wherein the aqueous solution beneficially comprises at least about 30 weight percent water, suitably about 50 weight percent water, more suitably about 75 weight percent water, and most suitably about 100 weight percent water. When another liquid is employed with the water, such other suitable liquids include methanol, ethanol, isopropanol, and acetone. However, the use or presence of such other non-aqueous liquids may impede the formation of an essentially homogeneous mixture such that the cellulosic fibers do not effectively disperse into the aqueous solution and effectively or uniformly mix with the water. Such a mixture should generally be prepared under conditions that are sufficient for the cellulosic fibers and water to be effectively mixed together. Generally, such conditions will include using a temperature that is between about 10° C. and about 100° C. In general, cellulosic fibers are prepared by pulping or other preparation processes in which the cellulosic fibers are present in an aqueous solution.

In some embodiments, a "softener" or "debonder" may be added to one or more layers of a ply used in the tissue of the present invention. As used herein, "softener" or "debonder" is a chemical compound that serves to soften the final tissue product. These compounds may be selected from the group of compounds consisting of: quaternary ammonium compounds, quaternary protein compounds, phospholipids, silicone quaternaries, quaternized, hydrolyzed wheat protein/dimethicone phosphocopolyol copolymer, organoreactive polysiloxanes, and silicone glycols. Other debonding agents also could be used.

For example, compounds and procedures similar to that disclosed in U.S. Pat. No. 6,156,157 could be employed. A quaternary ammonium compound softener/debonder (methyl-1-oleyl amidoethyl-2-oleyl imidazolinium methyl sulfate identified as Varisoft 3690 available from Witco Corporation could be employed, for example. Furthermore, as set forth in one or more examples below, an imidazoline-based debonding agent such as DC-83 manufactured by McIntyre Corporation of University Park, Ill., can be employed. In some applications, this debonding agent is added to the hardwood layers in an amount equivalent to about 6 lbs/Ton (i.e., to the two eucalyptus stock chests).

Refining of Fiber

Refining or beating of chemical pulps is the mechanical treatment and modification of fibers so that they can be formed into paper or board having desirable properties. It is used when preparing papermaking fibers for high-quality papers or paperboards, and in the past has not been widely employed for bathroom tissue or similar soft tissue products.

Refining improves the bonding ability of fibers so that they form a strong and smooth paper sheet with good printing properties. Sometimes refining shortens fibers that are too long for a good sheet formation, or to develop other pulp properties such as absorbency, porosity, or optical properties specifically for a given paper grade.

A common refining or beating method is to treat fibers in the presence of water with metallic bars. The plates or fillings are grooved so that the bars that treat fibers and the grooves between bars allow fiber transportation through the refining machine. Such machines are known in the papermaking art.

Papermaking Processes

A tissue product made in accordance with the present invention can generally be formed according to a variety of papermaking processes known in the art. In fact, any process capable of making a tissue web can be utilized in the present invention. For example, a papermaking process of the present invention can utilize wet-pressing, creping, through-air-drying, creped through-air-drying, uncreped through-air-drying, single recreping, double recreping, calendering, embossing, air laying, as well as other steps in processing the tissue web. For instance, some suitable papermaking processes are described in U.S. Pat. No. 5,129,988 to Farrington, Jr.; U.S. Pat. No. 5,494,554 to Edwards, et al.; and U.S. Pat. No. 5,529,665 to Kaun, which are incorporated herein in their entirety by reference thereto for all purposes.

In this regard, various embodiments of a method for forming a multi-layered tissue web will now be described in more detail. Referring to FIG. 1, a method of making a wet-pressed tissue in accordance with one embodiment of the present invention is shown, commonly referred to as couch forming, wherein two wet web layers are independently formed and thereafter combined into a unitary web. To form the first web layer, a specified fiber (either hardwood or softwood) is prepared in a manner well known in the papermaking arts and delivered to the first stock chest 1, in which the fiber is kept in an aqueous suspension. A stock pump 2 supplies the required amount of suspension to the suction side of the fan pump 4. If desired, a metering pump 5 can supply an additive (e.g., latex, reactive composition, etc.) into the fiber suspension. Additional dilution water also is mixed with the fiber suspension.

The entire mixture of fibers is then pressurized and delivered to the headbox 6. The aqueous suspension leaves the headbox 6 and is deposited on an endless papermaking fabric 7 over the suction box 8. The suction box is under vacuum that draws water out of the suspension, thus forming the first layer. In this example, the stock issuing from the headbox 6 would be referred to as the "air side" layer, that layer eventually being positioned away from the dryer surface during drying.

The forming fabric can be any forming fabric, such as fabrics having a fiber support index of about 150 or greater. Some suitable forming fabrics include, but are not limited to, single layer fabrics, such as the Appleton Wire 94M available from Albany International Corporation, Appleton Wire Division, Menasha, Wis.; double layer fabrics, such as the Asten 866 available from Asten Group, Appleton, Wis.; and triple layer fabrics, such as the Lindsay 3080, available from Lindsay Wire, Florence, Miss.

The consistency of the aqueous suspension of papermaking fibers leaving the headbox can be from about 0.05 to about 2%, and in one embodiment, about 0.2%. The first headbox 6 can be a layered headbox with two or more layering chambers which delivers a stratified first wet web layer, or it can be a monolayered headbox which delivers a blended or homogeneous first wet web layer.

To form the second web layer, a specified fiber (either hardwood or softwood) is prepared in a manner well known in the papermaking arts and delivered to the second stock chest 11, in which the fiber is kept in an aqueous suspension. A stock pump 12 supplies the required amount of suspension to the suction side of the fan pump 14. A metering pump 5 can supply additives (e.g., latex, reactive composition, etc.) into the fiber suspension as described above. Additional dilution water 13 is also mixed with the fiber suspension. The entire mixture is then pressurized and delivered to the headbox 16. The aqueous suspension leaves the headbox 16 and is deposited onto an endless papermaking fabric 17 over the suction box 18. The suction box is under vacuum that draws water out of the suspension, thus forming the second wet web. In this example, the stock issuing from the headbox 16 is referred to as the "dryer side" layer as that layer will be in eventual contact with the dryer surface. Suitable forming fabrics for the forming fabric 17 of the second headbox include those forming fabrics previously mentioned with respect to the first headbox forming fabric.

After initial formation of the first and second wet web layers, the two web layers are brought together in contacting relationship (couched) while at a consistency of from about 10 to about 30%. Whatever consistency is selected, it is typically desired that the consistencies of the two wet webs be substantially the same. Couching is achieved by bringing the first wet web layer into contact with the second wet web layer at roll 19.

After the consolidated web has been transferred to the felt 22 at vacuum box 20, dewatering, drying and creping of the consolidated web is achieved in the conventional manner. More specifically, the couched web is further dewatered and transferred to a dryer 30 (e.g., Yankee dryer) using a pressure roll 31, which serves to express water from the web, which is absorbed by the felt, and causes the web to adhere to the surface of the dryer. The web is then dried, optionally creped and wound into a roll 32 for subsequent converting into the final creped product.

Figure 2:
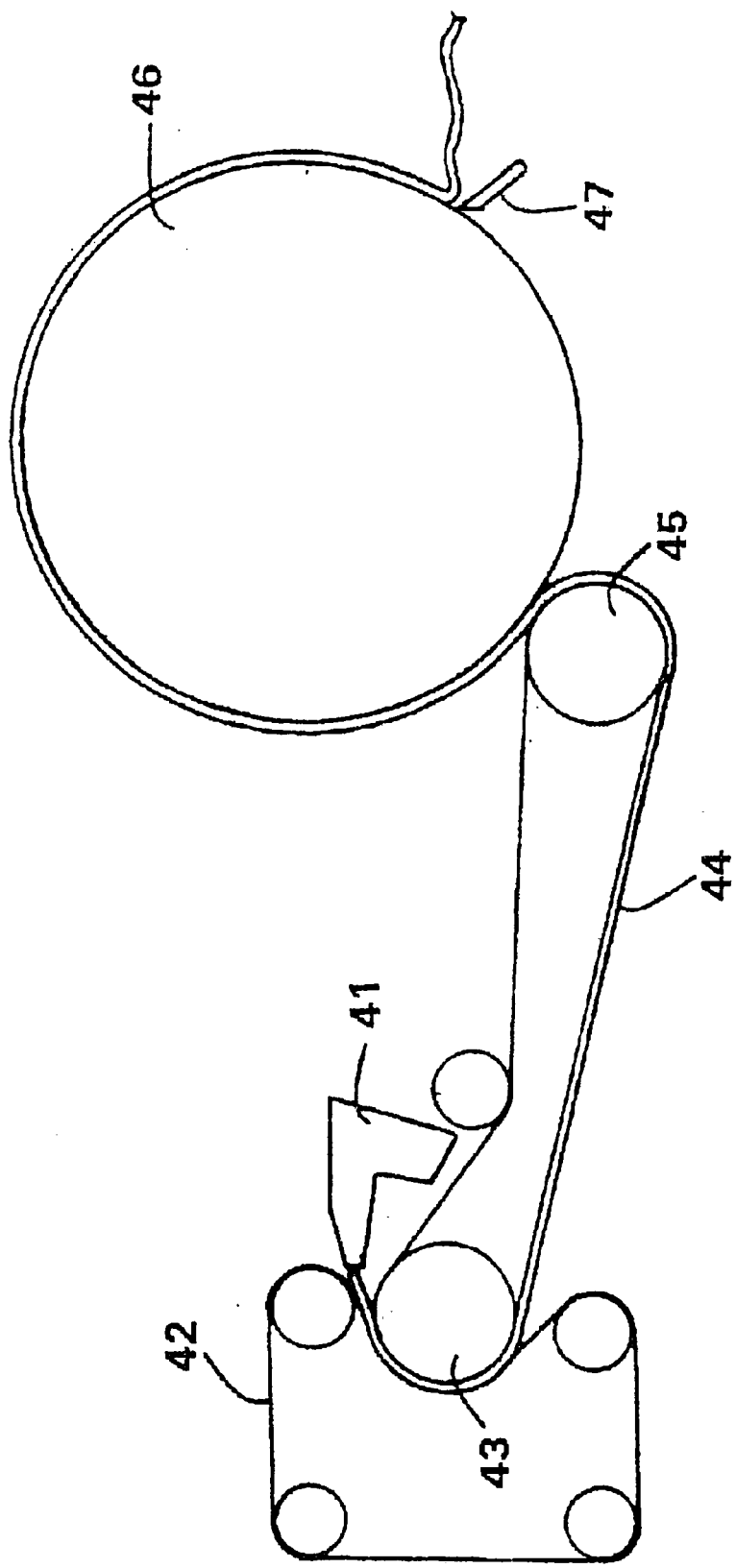
FIG. 2 is a schematic flow diagram of another embodiment of a papermaking process that can be used in the present invention.

FIG. 2 is a schematic flow diagram of another embodiment of a papermaking process that can be used in the present invention. For instance, a layered headbox 41, a forming fabric 42, a forming roll 43, a papermaking felt 44, a press roll 45, a Yankee dryer 46, and a creping blade 47 are shown. Also shown, but not numbered, are various idler or tension rolls used for defining the fabric runs in the schematic diagram, which may differ in practice. In operation, a layered headbox 41 continuously deposits a layered stock jet between the forming fabric 42 and the felt 44, which is partially wrapped around the forming roll 43. Water is removed from the aqueous stock suspension through the forming fabric 42 by centrifugal force as the newly-formed web traverses the arc of the forming roll. As the forming fabric 42 and felt 44 separate, the wet web stays with the felt 44 and is transported to the Yankee dryer 46.

At the Yankee dryer 46, the creping chemicals are continuously applied on top of the existing adhesive in the form of an aqueous solution. The solution is applied by any convenient means, such as using a spray boom that evenly sprays the surface of the dryer with the creping adhesive solution. The point of application on the surface of the dryer 46 is immediately following the creping doctor blade 47, permitting sufficient time for the spreading and drying of the film of fresh adhesive.

In some instances reactive compositions may be applied to the web as it is being dried, such as through the use of the spray boom. For example, the spray boom can apply the additives to the surface of the drum 46 separately and/or in combination with the creping adhesives such that such additives are applied to an outer layer of the web as it passes over the drum 46. In some embodiments, the point of application on the surface of the dryer 46 is the point immediately following the creping blade 47, thereby permitting sufficient time for the spreading and drying of the film of fresh adhesive before contacting the web in the press roll nip. Methods and techniques for applying an additive to a dryer drum are described in more detail in U.S. Pat. No. 5,853,539 to Smith, et al. and U.S. Pat. No. 5,993,602 to Smith, et al., which are incorporated herein in their entirety by reference thereto for all purposes.

The wet web is applied to the surface of the dryer 46 by a press roll 45 with an application force of, in one embodiment, about 200 pounds per square inch (psi). Following the pressing or dewatering step, the consistency of the web is typically at or above about 30%. Sufficient Yankee dryer steam power and hood drying capability are applied to this web to reach a final consistency of about 95% or greater, and particularly 97% or greater. The sheet or web temperature immediately preceding the creping blade 47, as measured, for example, by an infrared temperature sensor, is typically about 235° F.

The web can also be dried using non-compressive drying techniques, such as through-air drying. A through-air dryer accomplishes the removal of moisture from the web by passing air through the web without applying any mechanical pressure. Through-air drying can increase the bulk and softness of the web. Examples of such a technique are disclosed in U.S. Pat. No. 5,048,589 to Cook, et al.; U.S. Pat. No. 5,399,412 to Sudall, et al.; U.S. Pat. No. 5,510,001 to Hermans, et al.; U.S. Pat. No. 5,591,309 to Rugowski, et al.; and U.S. Pat. No. 6,017,417 to Wendt, et al., which are incorporated herein in their entirety by reference thereto for all purposes.

Figure 3:
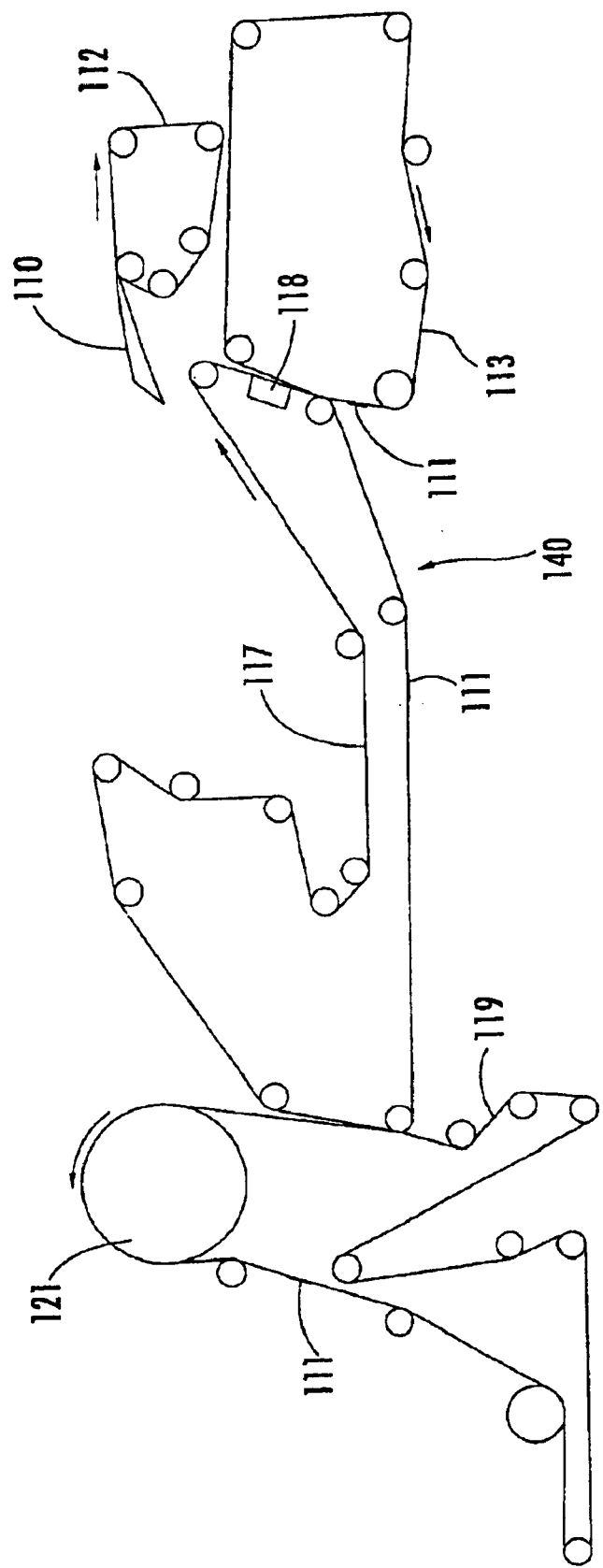
FIG. 3 is a schematic flow diagram of still another embodiment of a papermaking process that can be used in the present invention.

For example, referring to FIG. 3, one embodiment of a papermaking machine that can be used in forming an uncreped through-dried tissue product is illustrated. For simplicity, the various tensioning rolls schematically used to define the several fabric runs are shown but not numbered. As shown, a papermaking headbox 110 can be used to inject or deposit a stream of an aqueous suspension of papermaking fibers onto an upper forming fabric 112. The aqueous suspension of fibers is then transferred to a lower forming fabric 113, which serves to support and carry the newly-formed wet web 111 downstream in the process. If desired, dewatering of the wet web 111 can be carried out, such as by vacuum suction, while the wet web 111 is supported by the forming fabric 113.

The wet web 111 is then transferred from the forming fabric 113 to a transfer fabric 117 while at a solids consistency of between about 10% to about 35%, and particularly, between about 20% to about 30%. As used herein, a "transfer fabric" is a fabric that is positioned between the forming section and the drying section of the web manufacturing process. In this embodiment, the transfer fabric 117 is a patterned fabric having protrusions or impression knuckles, such as described in U.S. Pat. No. 6,017,417 to Wendt et al. Typically, the transfer fabric 117 travels at a slower speed than the forming fabric 113 to enhance the "MD stretch" of the web, which generally refers to the stretch of a web in its machine or length direction (expressed as percent elongation at sample failure). For example, the relative speed difference between the two fabrics can be from 0% to about 80%, in some embodiments greater than about 10%, in some embodiments from about 10% to about 60%, and in some embodiments, from about 15% to about 30%. This is commonly referred to as "rush" transfer. One useful method of performing rush transfer is taught in U.S. Pat. No. 5,667,636 to Engel et al., which is incorporated herein in its entirety by reference thereto for all purposes.

Transfer to the fabric 117 may be carried out with the assistance of positive and/or negative pressure. For example, in one embodiment, a vacuum shoe 118 can apply negative pressure such that the forming fabric 113 and the transfer fabric 117 simultaneously converge and diverge at the leading edge of the vacuum slot. Typically, the vacuum shoe 118 supplies pressure at levels between about 10 to about 25 inches of mercury. As stated above, the vacuum transfer shoe 118 (negative pressure) can be supplemented or replaced by the use of positive pressure from the opposite side of the web to blow the web onto the next fabric. In some embodiments, other vacuum shoes can also be used to assist in drawing the fibrous web 111 onto the surface of the transfer fabric 117.

From the transfer fabric 117, the fibrous web 111 is then transferred to the through-drying fabric 119. When the wet web 111 is transferred to the fabric 119. While supported by the through-drying fabric 119, the web 111 is then dried by a through-dryer 121 to a solids consistency of about 95% or greater. The through-dryer 121 accomplishes the removal of moisture from the web 111 by passing air therethrough without applying any mechanical pressure. Through-drying can also increase the bulk and softness of the web 111. In one embodiment, for example, the through-dryer 121 can contain a rotatable, perforated cylinder and a hood for receiving hot air blown through perforations of the cylinder as the through-drying fabric 119 carries the web 111 over the upper portion of the cylinder. The heated air is forced through the perforations in the cylinder of the through-dryer 121 and removes the remaining water from the web 111. The temperature of the air forced through the web 111 by the through-dryer 121 can vary, but is typically from about 250° F. to about 500° F. It should also be understood that other non-compressive drying methods, such as microwave or infrared heating, can be used.

In one embodiment, three-layer webs may be plied to form a two-ply tissue in which each ply contains three-layers. For example, in one embodiment, the outer layers of each ply contain hardwood fibers and the inner layer contains softwood fibers. In such instances, each three-layered ply may contain from about 50% to about 80% hardwood fibers, and from about 20% to about 50% softwood fibers. More preferably, the total amount of hardwood fibers may be from about 60% to about 70% (i.e., from about 30% to about 35% in each outer layer), and a total softwood fiber amount of from about 30% to about 40%.

In some embodiments of the invention, a three-layer structure having from about 22% about 32% fiber in the outer hardwood layer, about 35% softwood fiber in the interface (i.e., middle layer), and about 32% to about 33% hardwood fiber in the second outer hardwood layer may be employed. Of course, this describes one-ply, and it is understood that the layered structure would be mated with at least one other layer structure to form a multi-ply structure. In some embodiments of the invention, for example, a three-ply, four-ply, or more ply product can be manufactured and employed.

Figure 4A:
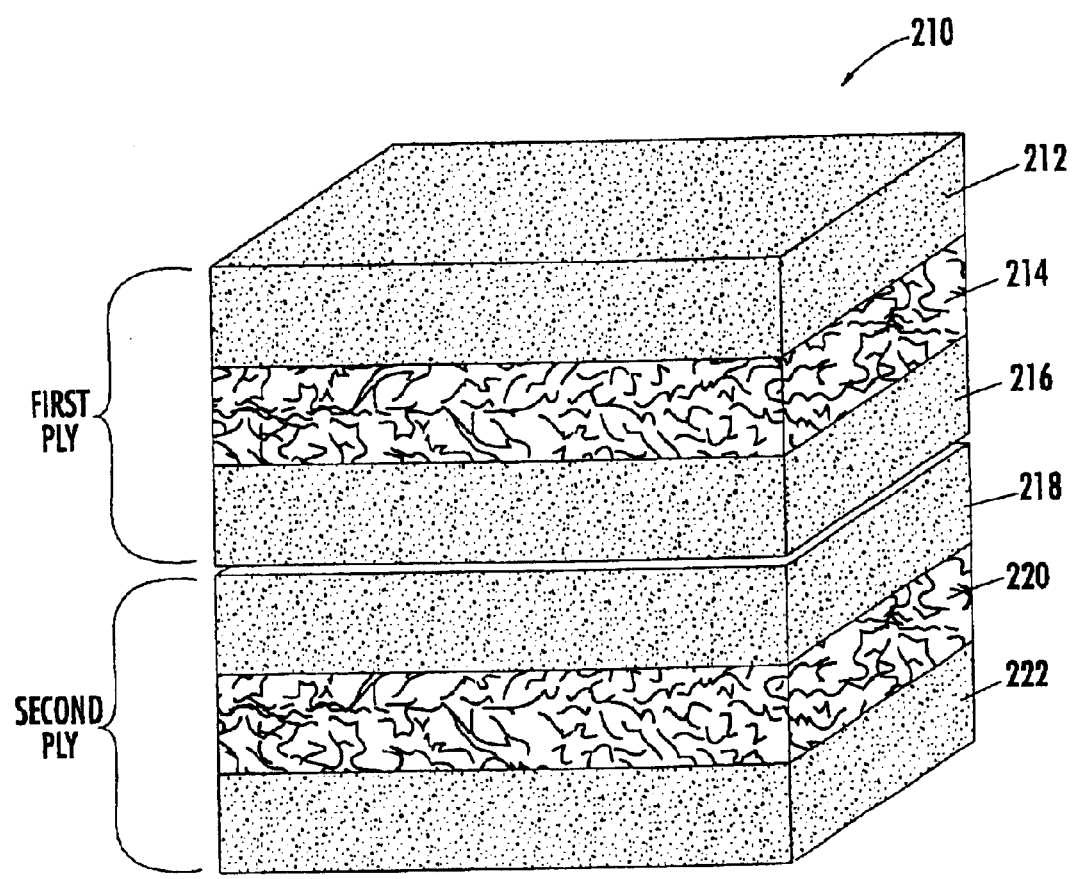
FIG. 4A is a representation of a two-ply tissue assembled according to one embodiment of the invention.

Turning to FIG. 4A, a two-ply tissue product 210 is shown. A first hardwood layer 212, a second hardwood layer 216, and a softwood layer 214 are shown in the first ply. The softwood layer 214 is positioned between the first hardwood layer 212 and the second hardwood layer 216. Likewise, the second ply comprises a first hardwood layer 218, a second hardwood layer 222, and a softwood layer 220 in between. The first ply and second ply are crimped or pressed together in the final two-ply tissue product 210.

Figure 4B:
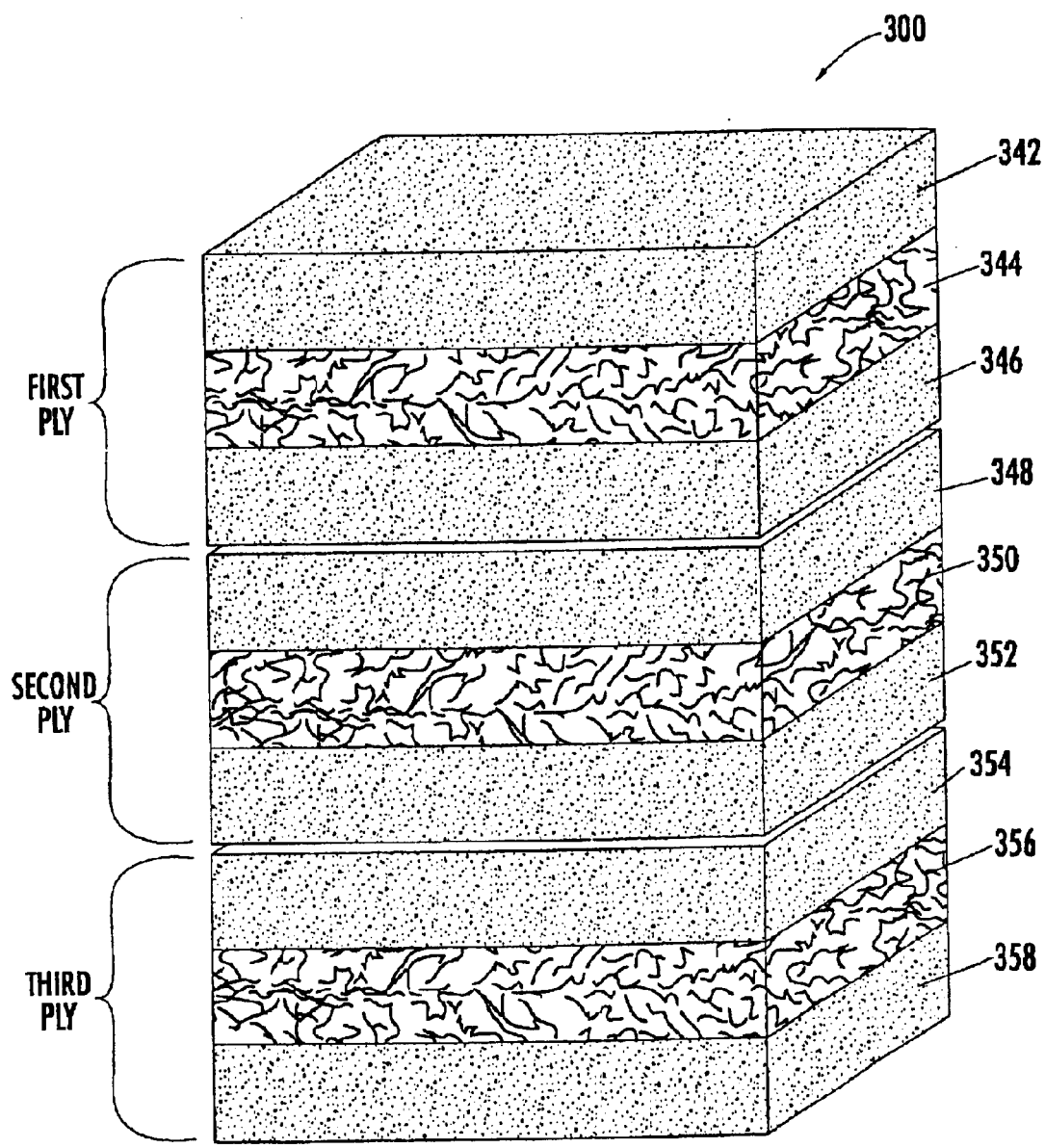
FIG. 4B is a representation of a three-ply tissue assembled according to one embodiment of the invention.

In FIG. 4B, a three-ply tissue product 340 is shown. The first ply comprises a first hardwood layer 342, a second hardwood layer 346, and a softwood layer 344 therebetween. A second ply likewise includes a first hardwood layer 348, a second hardwood layer 352, and a softwood layer 350. A third ply includes a first hardwood layer 354, a second hardwood layer 358, and a softwood layer 356.

Figure 4C:
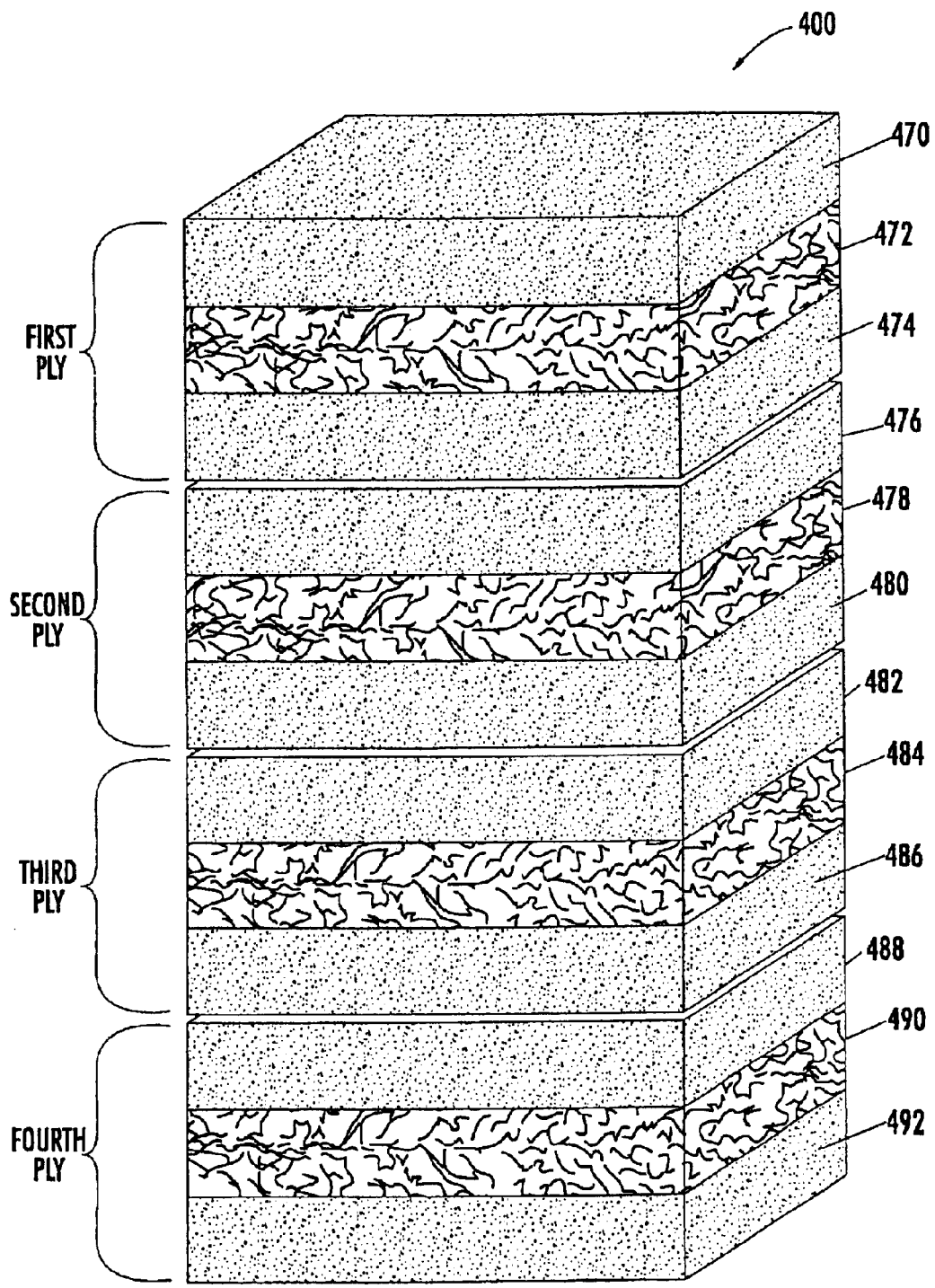
FIG. 4C is a representation of a four-ply tissue assembled according to one embodiment of the invention.

FIG. 4C reveals a four-ply tissue product 400. This embodiment of the invention includes four plies, with hardwood layers 470, 474, 476, 480, 482, 486, 488 and 492. Softwood layers 472, 478, 484, and 490 also are shown. Each ply provides a respective softwood layer between two other hardwood layers, as shown in the FIG. 4C.

Tensile (GMT) Strength Test Method

Geometric mean tensile (GMT) strength values shown in the examples below were obtained on a MTS/Sintech tensile tester, available from the MTS Systems Corp. Eden Prairie, Minn. Tissue samples measuring 3 inches wide were cut in both the machine and cross-machine directions. For each test, a sample strip was placed in the jaws of the tester, set at a 4-inch gauge length (for facial tissue) and 2-inch gauge length (for bath tissue). The crosshead speed during the test was 10 inches 1 minute. The tester was connected with a computer loaded with data acquisition system; e.g., MTS TestWork for windows software. Readings were taken directly from a computer screen readout at the point of rupture to obtain the tensile strength of an individual sample. GMT (grams per 3 inch of sample)=(square root of product of MD tensile strength)×(CD tensile strength).

Handfeel (Softness) Testing and Stiffness

Stiffness (or softness) was ranked on a scale from 0 (described as pliable/flexible) to 16 (described as stiff/rigid). Twelve (12) panelists were asked to consider the amount of pointed, rippled or cracked edges or peaks felt from the sample while turning in your hand. The panelists were instructed to place two tissue samples flat on a smooth tabletop. The tissue samples overlapped one another by 0.5 inches (1.27 centimeters) and were flipped so that opposite sides of the tissue samples were represented during testing. With forearms/elbows of each panelist resting on the table, they placed their open hand, palm down, on the samples. Each was instructed to position their hand so their fingers were pointing toward the top of the samples, approximately 1.5 inches (approximately 3.81 centimeters) from the edge. Each panelist moved their fingers toward their palm with little or no downward pressure to gather the tissue samples. They gently moved the gathered samples around in the palm of their hand approximately 2 to 3 turns. The rank assigned by each panelist for a given tissue sample was then averaged and recorded.

Slough Measurement Methods and Apparatus

To determine the abrasion resistance or tendency of fibers to be rubbed from the web, samples were measured by abrading the tissue specimens by way of the following method. This test measures the resistance of tissue material to abrasive action when the material is subjected to a horizontally reciprocating surface abrader. All samples were conditioned at about 23° C. and about 50% relative humidity for a minimum of 4 hours.

Figure 5:
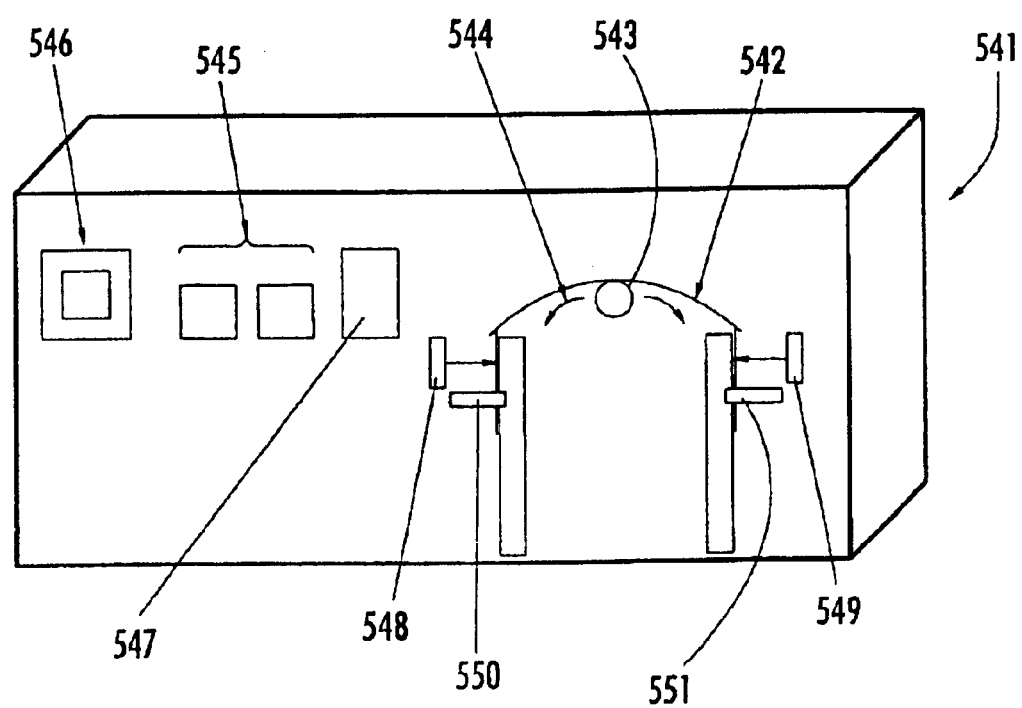
FIG. 5 is a perspective view of a machine used to measure slough of a paper sample.

FIG. 5 shows a diagram of the test equipment that may be employed to abrade a sheet. In FIG. 5, a machine 541 having a mandrel 543 receives a tissue sample 542. A sliding magnetic clamp 548 with guide pins (not shown) is positioned opposite a stationary magnetic clamp 549, also having guide pins (550-551). A cycle speed control 547 is provided, with start/stop controls 545 located on the upper panel, near the upper left portion of FIG. 5. A counter 546 is shown on the left side of machine 541, which displays counts or cycles.

In FIG. 5, the mandrel 543 used for abrasion may consist of a stainless steel rod, about 0.5" in diameter with the abrasive portion consisting of a 0.005" deep diamond pattern extending 4.25" in length around the entire circumference of the rod. The mandrel 543 is mounted perpendicular to the face of the machine 541 such that the abrasive portion of the mandrel 543 extends out from the front face of the machine 541. On each side of the mandrel 543 are located guide pins 550-551 for interaction with sliding magnetic clamp 548 and stationary magnetic clamp 549, respectively. These sliding magnetic clamp 548 and stationary magnetic clamp 549 are spaced about 4" apart and centered about the mandrel 543. The sliding magnetic clamp 548 and stationary magnetic clamp 549 are configured to slide freely in the vertical direction.

Using a die press with a die cutter, specimens are cut into 3" wide×8" long strips with two holes at each end of the sample. For tissue samples, the Machine Direction (MD) corresponds to the longer dimension. Each test strip is weighed to the nearest 0.1 mg. Each end of the sample 542 is applied upon the guide pins 550-551 and sliding magnetic clamp 548 and stationary magnetic clamp 549 to hold the sample 542 in place.

The mandrel 543 is then moved back and forth at an approximate 15 degree angle from the centered vertical centerline in a reciprocal horizontal motion against the test strip for 20 cycles (each cycle is a back and forth stroke), at a speed of about 80 cycles per minute, removing loose fibers from the web surface. Additionally the spindle 543 rotates counter clockwise (when looking at the front of the instrument) at an approximate speed of 5 revolutions per minute (rpm). The sliding magnetic clamp 548 and stationary magnetic clamp 549 then are removed from the sample 542. Sample 542 is removed by blowing compressed air (approximately 5–10 psi) upon the sample 542.

The sample 542 is weighed to the nearest 0.1 mg and the weight loss calculated. Ten test samples per tissue sample may be tested and the average weight loss value in milligrams is recorded. The result for each example was compared with a control sample containing no hairspray.

Procedures Employed in the Examples

To demonstrate the ability to form a multi-ply tissue that is slough and has low amounts of slough, several tissue prototypes were produced (Examples 1–3) on a small-scale continuous pilot machine. This machine formed two separate tissue sheets and mated them together into a single sheet that was then pressed, dried and creped. The bottom sheets were formed by way of a headbox having two layers. This configuration allowed simulation of a three-layered tissue sheet. Each layer had its own stock system including stock chest, metering pump, fan pump and white water handling. This allowed each layer to have its own fiber blend and independent chemical treatment. The chemicals could be added to the chest to create a single batch at one concentration or metered into the stock line to allow periodic adjustment.

EXAMPLE 1

Two-Layer, Two-Ply Tissue as Control

In this example, a two-ply tissue in which each ply contains two-layers was made using the same fiber furnishes for forming each ply.

The dryer side stock chest contained eucalyptus fibers obtained from Bahil Su, Inc. Permanent wet strength agent (Kymene from Hercules, Inc.) was added in an amount equivalent to about 4 lbs/ton (i.e., about 0.2%) to the dryer side stock chest. The air side stock chest contained a northern softwood Kraft fiber (LL-19, from Kimberly-Clark Corporation). Permanent wet strength agent (Kymene from Hercules, Inc.) was also added in an amount equivalent to about 4 lbs/ton (i.e., about 0.2%) to the LL-19 fiber.

The LL-19 fiber was subjected to about 4 minutes refining with a refiner located below the stock chest. A dry strength agent (Parez from Cytec) was added to the softwood side stock pump to adjust tensile strength. During the converting stage, the tissue sheet was plied with the hardwood layer on the outside. The tissue sheets contained about 35% LL-19 softwood fibers and about 65% eucalyptus fibers, in total. The tensile strength, slough of the tissue sheets was tested. The softness properties of the tissue sheets were evaluated with panel tester as shown in Table 1 below.

EXAMPLE 2

Three-Layer, Two-Ply Tissue

In this example of one embodiment of the invention, a two-ply tissue was manufactured in which each ply was a three-layered web with hardwood eucalyptus fibers as the outer layers and LL-19 fibers as the inner layer. The two plies were crimped together into a two-ply tissue.

Specifically, eucalyptus fibers were applied in the top former (headbox). Also, eucalyptus fibers were employed in the lower layer of the bottom former (headbox), while the LL-19 fibers were employed in the top layer of the bottom former (headbox).

Permanent wet strength (Kymene, available from Hercules, Inc) was added in an amount equivalent to about 4 lbs/ton (about 0.2%) to a three layer stock chest. The LL-19 fiber was subjected to about 4 minutes refining with a refiner located below the stock chest. A dry strength agent (Parez from Cytec) was added to the softwood side stock pump to adjust tensile strength.

During the converting stage, each three-layer tissue sheet was plied to form a two-ply tissue. The percentage of total fiber in each ply was 32.5% by weight of eucalyptus fiber in one outer layer, 35% by weight of LL-19 fibers in the middle layer, and 32.5% by weight of eucalyptus fiber in the other outer layer. Overall, the tissue still contained 35% LL-19 softwood fibers and 65% eucalyptus fibers as in the control example 1 above. The tensile strength and slough of the tissue sheets were tested, and reported below in Table 1. The softness properties of the tissue sheets were evaluated with panel tester as shown in Table 1.

EXAMPLE 3

Three-Layer, Two-Ply Tissue with Debonding Agent in the Hardwood Layer

The tissue was prepared according to Example 2, except that an imidazoline-based debonder (DC-83) was added to the two eucalyptus stock chests in an amount equivalent to about 6 lbs/ton per layer. Furthermore, the LL-19 fiber was subjected to about 10 minutes refining with a refiner located beneath the stock chest.

The tensile strength and slough of the tissue sheets were tested. The softness properties of the tissue sheets also were evaluated with panel tester as shown in the Table 1 below.

TABLE 1

|  |  | GMT g/3 in. | Slough, mg | Panel Stiffness |
| --- | --- | --- | --- | --- |
| Example 1 | Two-Layered, Two-Ply (Control) | 777 | 7.38 | 3.6 |
| Example 2 | Three-Layered, Two-Ply | 559 | 5.26 | 3.3 |
| Example 3 | Three-Layered With Debonder in the Hardwood Layer | 726 | 4.97 | 2.9 |

The three-layered, two-ply tissue (Example 2) provided above has 10 a significantly lower slough than the two-layered, two ply tissue (Example 1, control). The three-layer, two-ply tissue with debonder in the hardwood layers has a significantly lower slough than the two-layered, two-ply tissue (Example 1, control). In addition, the three-layered, two-ply with debonder in the hardwood layers has a significantly lower panel stiffness rating than the two-layered, two-ply tissue (Example 1, control), comparing at a similar or comparable strength.

EXAMPLE 4

Three-Layer, Three-Ply Product

A product was manufactured as in Example 2, except that a three-ply product was produced.

EXAMPLE 5

Three-Layer, Three-Ply Product with Debonding Agent in Hardwood Layer

A product was manufactured as in Example 3, except that a three-ply product was produced.

EXAMPLE 6

Three-Layer, Four-Ply Product

A product was manufactured as in Example 2, except that a four-ply product was produced.

EXAMPLE 7

Three-Layer, Four-Ply Product with Debonding Agent in Hardwood Layer

A product was manufactured as in Example 3, except that a four-ply product was produced.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A multi-ply tissue product, comprising:
   (a) a first ply, the first ply comprising:
      a first hardwood layer,
      a second hardwood layer, and
      a softwood layer positioned between the first and second hardwood layers of the first ply; and
   (b) a second ply, the second ply comprising:
      a first hardwood layer,
      a second hardwood layer, and
      a softwood layer positioned between the first and second hardwood layers of the second ply, wherein the second hardwood layer of the first ply is positioned adjacent to the first hardwood layer of the second ply such that the first hardwood layer of the first ply defines an outer surface of the product, and wherein said outer surface is creped.

2. The product of claim 1 in which the first hardwood layer of the first ply and the second hardwood layer of the second ply define outer surfaces of the product.

3. The product of claim 1 in which the total percentage by weight of hardwood fibers in the product is between about 50 and about 80 percent.

4. The product of claim 1 in which the total percentage by weight of softwood fibers in the product is between about 20 and about 50 percent.

5. The product of claim 1 in which one or more layers of the first ply, the second ply, or combinations thereof, comprise a debonder.

6. The product of claim 1 in which a debonder is applied to one or more hardwood layers of the first ply, the second ply, or combinations thereof.

7. The product of claim 1 in which the softwood fibers of one or more of the softwood layers of the first ply, the second ply, or combinations thereof, are refined.

8. The product of claim 1 in which the total amount of hardwood fibers in the product is from about 60 to about 70 percent, and the total amount of softwood fibers in the product is from about 30 to about 40 percent.

9. The product of claim 1 in which the total amount of hardwood fibers in the product is about 65%.

10. The product of claim 1 in which the hardwood fibers of one or more of the hardwood layers of the first ply, the second ply, or combinations thereof, comprise eucalyptus fibers.

11. The product of claim 1 in which the softwood fibers of one or more of the softwood layers of the first ply, the second ply, or combinations thereof, comprise northern softwood kraft fibers.

12. The product of claim 1 in which the first ply is crimped together with the second ply along the edges thereof.

13. The product of claim 1, further comprising:
   (c) a third ply, the third ply comprising:
      a first hardwood layer,
      a second hardwood layer, and
      a softwood layer positioned between the first and second hardwood layers of the third ply, wherein the first hardwood layer of the third ply is positioned adjacent to the second hardwood layer of the second ply.

14. The product of claim 13 in which the first hardwood layer of the first ply and the second hardwood layer of the third ply define outer surfaces of the product.

15. The product of claim 13 further comprising:
   (d) a fourth ply, the fourth ply comprising:
      a first hardwood layer,
      a second hardwood layer, and
      a softwood layer positioned between the first and second hardwood layers of the fourth ply, wherein the first hardwood layer of the fourth ply is positioned adjacent to the second hardwood layer of the third ply.

16. The product of claim 15 in which the first hardwood layer of the first ply and the second hardwood layer of the fourth ply define outer surfaces of the product.

17. A multi-ply tissue, comprising:
   (a) a first ply, the first ply comprising:
      a first hardwood layer,
      a second hardwood layer, and
      a softwood layer positioned between the first and second hardwood layers of the first ply; and
   (b) a second ply mated to the first ply, the second ply comprising:
      a first hardwood layer,
      a second hardwood layer, and
      a softwood layer positioned between the first and second hardwood layers of the second ply, wherein the second hardwood layer of the first ply is positioned adjacent to the first hardwood layer of the second ply such that the first hardwood layer of the first ply defines an outer surface of the tissue, wherein said outer surface is creped; and
   wherein the total hardwood fiber content of the tissue is from about 50 to about 80 percent by weight.

18. The tissue of claim 17 in which the total hardwood fiber content of the tissue is from about 60 to about 70 percent by weight.

19. The tissue of claim 17 further comprising a third ply.

20. The tissue of claim 19 further comprising a fourth ply.

21. The tissue of claim 17 in which the total softwood fiber content of the tissue is from about 30 to about 40 percent by weight.

22. The tissue of claim 17 in which one or more layers of the first ply, the second ply, or combinations thereof, comprise a debonder.

23. The tissue of claim 22 in which the debonder is employed in one or more of the hardwood layers of the first ply, the second ply, or combinations thereof.

* * * * *